UNITED STATES PATENT OFFICE.

GARDNER L. GRAY, OF PADUCAH, KENTUCKY, ASSIGNOR OF ONE-HALF TO JAKE BIEDERMAN, OF PADUCAH, KENTUCKY.

COMPOSITION FOR REMOVING SOOT FROM CHIMNEYS.

No. 853,873.      Specification of Letters Patent.      Patented May 14, 1907.

Application filed November 3, 1906. Serial No. 341,960.

*To all whom it may concern:*

Be it known that I, GARDNER L. GRAY, a citizen of the United States, and a resident of Paducah, in the county of McCracken and State of Kentucky, have made a certain new and useful Invention in Composition for Removing Soot from Chimneys; and I declare the following to be a full, clear, and exact description of the same, such as will enable others skilled in the art to which it appertains to make and use the invention.

The invention relates to means for removing soot from chimneys, and it consists in a novel composition consisting of certain ingredients compounded together substantially as hereinafter set forth.

In making this composition I take: 25 parts by measure of sodium chlorid or common salt. 25 parts of finely divided sludge zinc concentrates. 20 parts of rosin. 10 parts of ground oyster shells. 10 parts of hardwood sawdust. 10 parts of oxid of iron. These ingredients are each reduced to ground or pulverized form, and are then thoroughly mixed together.

This composition is used by throwing a portion of it upon a fire, when it will form a gas or vapor which will take the soot out of the fire box and pipe or chimney.

The sawdust is used as a filler or to give the composition the required body, while the oxid of iron is used as a coloring matter.

What I claim and desire to secure by Letters Patent is:

1. A soot removing composition consisting of sodium chlorid, a compound of zinc, rosin, shells, sawdust and oxid of iron compounded together substantially in the proportions and manner set forth.

2. A soot removing composition, consisting of sodium chlorid, a compound of zinc, rosin, shells, and a filler, compounded together substantially in the proportions and manner set forth.

In testimony whereof I affix my signature, in presence of two witnesses.

GARDNER L. GRAY.

Witnesses:
     B. W. BUCKLEY,
     H. Y. DAY.